Nov. 9, 1965    G. FEICK III    3,217,084
ELECTRIC CABLE HAVING COMPRESSED INSULATION
Filed Dec. 20, 1960

INVENTOR.
GEORGE FEICK III
BY
V. F. Volk

HIS AGENT

United States Patent Office 3,217,084
Patented Nov. 9, 1965

3,217,084
ELECTRIC CABLE HAVING COMPRESSED INSULATION
George Feick III, Needham, Mass., assignor, by mesne assignments, to Anaconda Wire and Cable Company, a corporation of Delaware
Filed Dec. 20, 1960, Ser. No. 77,236
10 Claims. (Cl. 174—25)

My invention relates to electric power cables and particularly to high voltage cables wherein there is a homogeneous solid layer of dielectric material immediately over the conducting elements.

It has been known to form electric cables by extruding dielectric material over elongated conductors and thus to surround the conductors with impervious walls of electrical insulation. Many different types of solid insulating materials have been successfully extruded over conductors to form insulated cables among which materials may be named polyethylene and polyvinyl chloride, as examples. Solid walls of insulation can also be applied by methods other than extrusion such as by repeated coatings applied by passing wires through suspensions or solutions with subsequent dryings. The walls may be applied by folding strips of insulating material around the conductors and fusing the insulation at the edges of the strips together by means of heat or pressure or both. The insulations applied by any of the above methods are characterized by having the form of solid, homogeneous walls completely surrounding the conductors and offering no passageway from the surfaces of the conductors to the outside surroundings.

In contradistinction to the solid insulations described above it is also known to form electric cables by insulating conductors with multiple layers of tapes of dielectric material. Preferably the tapes are wrapped spirally around the conductors in such a manner that the spaces between adjacent tapes are staggered from layer to layer. An insulation wall built up in this manner is not homogeneous since the edges of the tapes define air gaps and the surfaces of the tapes between layers also constitute discontinuities with adsorbed gaseous or liquid films. It is also known to fill the gaps in taped cables with dielectric fluids. This has the effect of improving the dielectric properties of the insulation but it does not alter the non-homogeneity that is always characteristic of taped insulations, unless, of course the individual tapes are fused together in some subsequent operation.

It would appear to an uninitiated observer that a solid insulation, since it is free from surfaces and discontinuities which afford possibilities of contamination would be dielectrically superior to taped insulation. This expectation would be further supported by the knowledge that a principal source of failure in cables subject to high voltages is the presence of voids which contain gases that become ionized in a strong electric field and offer foci for attacks on adjacent solid surfaces.

The opposite, however, has proven to be true. Taped insulations combined with dielectric fluid penetrants are successfully employed for cables rated in excess of 100,000 volts whereas solid insulations are virtually unused in service exceeding 25 kilovolts. This limitation on the ratings of cables with solid insulating walls has been dictated by practical experience where efforts to develop cables that would withstand test voltages comparable to the extra high voltages applied to taped insulations has up to now resulted in failure of the solid walled cables. The reason for these failures is difficult to determine experimentally since the structure of the insulation is invariably destroyed at the point of an actual failure or "blowout."

I have discovered that the dielectric properties of a solid wall of insulation are greatly enhanced by maintaining the insulation under a high, mechanically applied, pressure. Presumably the effectiveness of my method is due, at least in part, to the fact that known types of cables insulated with walls of solid dielectric inevitably contain occasional voids or cavities filled with air or other ionizable gases. Under the high electrical stresses at which these cables are tested, or which they encounter in service, these voids serve as sources of ionic bombardment which eventually penetrate the insulation wall. By compressing the insulation I am able to collapse any voids that remain therein and either drive the gas out by diffusion through the walls or so increase the gas pressure within the voids that ionization does not occur, even at high electrical stresses.

My invention is an electric cable comprising a conductor with a wall of solid insulation around it and turns of extensible material wrapped over the insulation. The extensible material is stretched so that the turns compress the insulation and increase its dielectric strength. The solid insulation of my cable may advantageously be a polyolefin and particularly polyethylene or polypropylene and the extensible strip may be a tape of a dielectric material such as nylon, polyethylene terephthalate, or polycarbonate but is not limited thereto and the strip is preferably stretched at a tension at least 30% of its breaking strength. The dielectric strength of my cable can be improved by permeating the layers of dielectric tape with a dielectric fluid confined in a suitable impervious enclosure.

I have invented a process for making my cable which comprises the steps of extruding the solid insulation over a conductor and then wrapping the insulated conductor with a plurality of turns of strip at a tension at least 30% of the breaking strength of the strip. The insulation can be cooled below room temperature before applying the strip and permitted to expand when it warms up. In either event the insulation will be compressed by the strip and will experience an increase in dielectric strength.

A more complete understanding of my invention may be gained by reference to the appended drawing.

Figure 1:
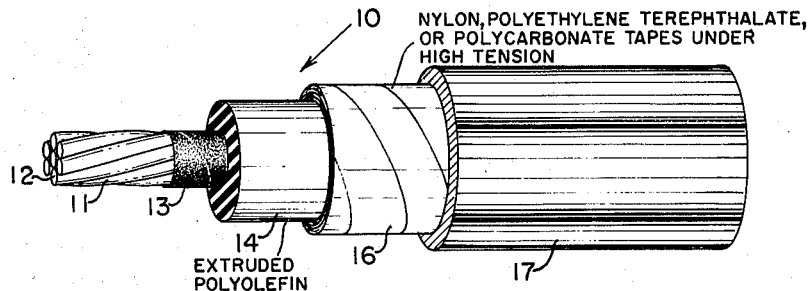
FIG. 1 is a cut-away perspective view of a cable made to my invention.

In FIG. 1 a cable 10 is comprised of a conductor 11 shown here as comprising seven concentrically stranded wires 12. The conductor 11 is preferably copper or aluminum but is not limited thereto and may have forms other than the concentric strand shown. The conductor 11 is advantageously covered with a wrapping of strand shielding tapes 13 which may be carbon black impregnated paper. Over the strand shielding tapes I have shown an extruded wall of polyethylene 14. My invention is also well suited to other insulations including the polyolefins which are applicable in solid form. In the polyolefins I include not only polymers formed of olefinic monomers of which butylene and propylene are examples but also copolymers of such monomers.

Over the extruded insulation 14, I have wrapped a plurality of layers of tensile strips 16. In a preferred embodiment of my invention the strips 16 are film tapes formed from materials such as polyethylene terephthalate and polycarbonate which are themselves dielectric and can contribute to the overall electrical strength of the cable. Strip material other than film tapes may be employed for the strips 16. Such material might be in the form of filaments or woven threads and may have very good electrical properties or the material may have relatively poor electrical properties. An example of a tensile material with relatively poor high-voltage electrical properties is nylon. It is essential however that the material comprising the strips 16 should be extensible so that they will stretch under tension and have a compressive action on the underlying insulation. In applying the strips 16 it is commercially desirable to keep the number of turns or layers to the minimum that are necessary to achieve the desired degree of compression of the insulation 14. For this reason the strips 16 should be tensioned at least 30% of their breaking strength.

It is well known in cable manufacture that the elements of the insulation in closest proximity to the conductors are subjected to the greatest electrical stresses and that any failure of the cable is most likely to be initiated in these elements. In the cable of my invention having a dielectric wall comprised of an inner solid insulation 14 and an outer strip insulation 16 applied under tension, it is an advantageous feature that the portion of the insulation nearest to the conductor and subjected to the greatest electrical stress is most highly compressed, while the outer layers of strip insulation which are not compressed are in the weakest portion of the electrical field. The degree of compression that can be applied to the inner wall of insulation of my cable can be seen from an example.

*Example 1*

A 1/0 Awg conductor with a diameter, in inches, of .375 over the strand shielding is insulated with a .220 inch wall of polyethylene, and is wrapped with 62 layers of 4-mil thick polycarbonate tape ½ inch wide and applied under 20 lb. tension. The diameter over the outer tape will be:

|  | Inch |
|---|---|
| Conductor | .375 |
| Polyethylene 2×.220 | .440 |
| Tape 62×2×.004 | .496 |
|  | 1.311 |

The hoop tension on a linear inch of the cable will be 62×2×20=2480 lbs. and the compressive stress on the cable will be 2×2480÷1.311=3783 p.s.i.

Cables are known having porous paper insulation saturated with oil and subjected to hydraulic pressure, but the highest pressures used commercially for such cables are of the order of 200 p.s.i. It would be utterly impractical to maintain hydraulic cable systems at pressures equivalent to the mechanical pressures easily attainable in the cable of my invention. Where it is desirable to permeate the strips 16 with oil the cable 10 will be enclosed in a lead sheath 17. Other forms of enclosure such as a steel pipe may be used instead of the lead sheath 17 and the oil within the enclosure 17 may be maintained under hydraulic pressure, adding to the pressure that is applied to the insulation 14.

Figure 2:
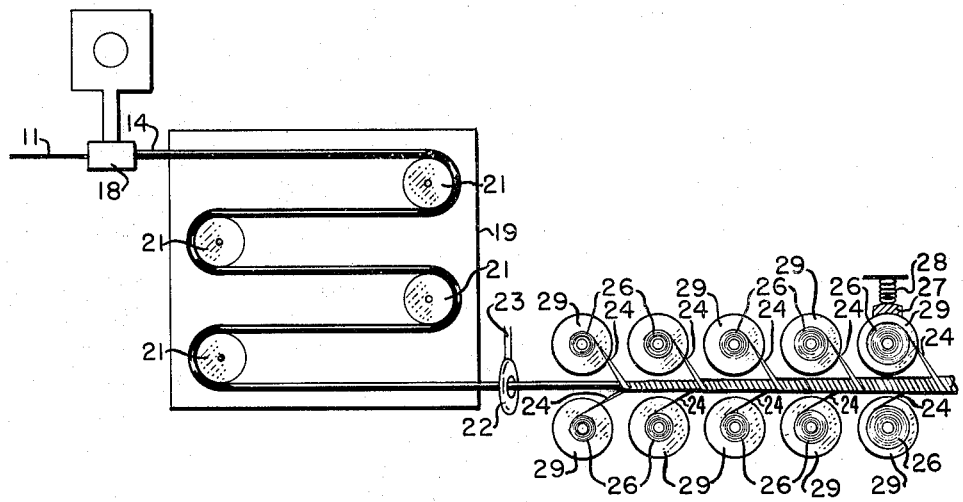
FIG. 2 is a schematic plan view of a process for making the cable of my invention.

In FIG. 2 the strand 11 is passed through an extrusion head 18 where the strand is covered with the polyethylene insulation 14. The insulated conductor then passes through a cooling system shown in the drawing as a tank 19 through which the cable may make a number of passes around guide pulleys 21. The tank 19 contains chilled water and pulleys 21 are provided within the tank to extend the path of the cable and increase the cooling time sufficiently to contract the wall of extruded insulation. Cooling should be sufficient to reduce the temperature of the insulation below room temperature so that none of the tension applied to the tapes is lost due to subsequent shrinkage of the underlying insulation. Other methods of chilling the extruded insulation may be practiced within the scope of my invention. The tank 19 may have the form of a single extended trough of a length sufficient to achieve the desired cooling effect. Alternatively the cable may be taken up on reels prior to taping and stored in a cold chamber until the insulation reaches the desired low temperature. Upon emersion from the cooling tank 19 the cable is dried as by an air jet from a ring blower 22 supplied from a source of compressed air (not shown) through the pipe 23. Tapes 24 are applied under tension from a plurality of pads 26 which are caused to rotate around the cable 10 by a suitable rotating frame not shown in the drawing. Tension may be applied to the pads 26 in any suitable manner of which one method is shown schematically by a brake shoe 27 urged by the compression spring 28 against a brake plate 29. For the sake of simplicity only one braking mechanism 27, 28, 29 has been shown but it will be readily understood that braking means are applied to each of the pads 26.

I claim:
1. A high-voltage electric cable comprising a conductor, a wall of solid extruded insulation around said conductor, said insulation being subject to voids, a large plurality of layers of extensible tape wrapped around said insulation, said tape being stretched and said insulation being continuingly compressed to a pressure of at least 200 p.s.i. by said layers thereby having increased dielectric strength in said extruded wall by virtue of the compression of any voids.

2. A high-voltage electric cable comprising a conductor, a wall of solid extruded insulation around said conductor, said insulation being subject to voids, a large plurality of layers of extensible tape wrapped around said insulation, said tape being stretched at a tension of at least 30% of its breaking strength and said insulation being continuingly compressed to a pressure of at least 200 p.s.i. by said layers thereby having increased dielectric strength in said extruded wall be virtue of the compression of any voids.

3. A high-voltage electric cable comprising a conductor, a wall of solid extruded insulation around said conductor, said insulation being subject to voids, a large plurality of layers of extensible dielectric tape wrapped around said insulation, said tape being stretched and said insulation being continuingly compressed to a pressure of at least 200 p.s.i. by said layers thereby having increased dielectric strength in said extruded wall by virtue of the compression of any voids.

4. The cable of claim 3 wherein said tape is comprised of nylon.

5. The cable of claim 3 wherein said tape is comprised of polyethylene terephthalate.

6. The cable of claim 3 wherein said tape is comprised of polycarbonate.

7. A high-voltage electric cable comprising a conductor, a wall of solid extruded polyolefin around said conductor, said insulation being subject to voids, a large plurality of layers of extensible tape wrapped around said polyolefin, said tape being stretched and said polyolefin being continuingly compressed to a pressure of at least 200 p.s.i. by said layers thereby having increased dielectric strength in said extruded wall by virtue of the compression of any voids.

8. The cable of claim 7 wherein said polyolefin is polyethylene.

9. The cable of claim 7 wherein said polyolefin is polypropylene.

10. A high-voltage electric cable comprising a conductor, a wall of solid extruded insulation around said conductor, said insulation being subject to voids, a large plurality of layers of extensible tape wrapped around said insulation, said tape being stretched, said insulation being continuingly compressed to a pressure of at least 200 p.s.i. by said layers thereby having increased dielectric strength in said extruded wall by virtue of the compression of any voids, dielectric fluid permeating said layers, and an impervious enclosure confining said fluid.

References Cited by the Examiner

UNITED STATES PATENTS

| | | | |
|---|---|---|---|
| 1,884,554 | 10/32 | Briggs | 18—59 |
| 2,309,992 | 2/43 | Scott et al. | 174—25 |
| 2,691,057 | 10/54 | McLean | 174—24 |
| 2,851,515 | 9/58 | Kolmorgen et al. | 174—120 X |
| 2,904,846 | 9/59 | Smith | 18—59 |
| 2,980,755 | 4/61 | Fairfield et al. | 174—24 |
| 2,993,820 | 7/61 | Marshall | 156—56 |
| 3,019,285 | 1/62 | Delutis | 156—56 X |
| 3,033,727 | 5/62 | Cram et al. | 156—56 |
| 3,048,651 | 8/62 | Howard et al. | 156—56 |

FOREIGN PATENTS 839,858   6/60   Great Britain.

JOHN F. BURNS, *Primary Examiner.*

BENNETT G. MILLER, JOHN P. WILDMAN, LARAMIE E. ASKIN, DARRELL L. CLAY, *Examiners.*